(12) United States Patent
Takakuwa et al.

(10) Patent No.: US 9,442,236 B2
(45) Date of Patent: Sep. 13, 2016

(54) LIQUID CRYSTAL DISPLAY INCLUDING WIRE GRID POLARIZER AND MANUFACTURING METHOD THEREOF

(75) Inventors: Atsushi Takakuwa, Hwaseong-si (KR); Dae Hwan Jang, Gwangmyeong-si (KR); Hyang-Shik Kong, Seongnam-si (KR); Gug Rae Jo, Asan-si (KR); Kyu Young Kim, Suwon-si (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 88 days.

(21) Appl. No.: 13/470,929

(22) Filed: May 14, 2012

(65) Prior Publication Data
US 2013/0120698 A1    May 16, 2013

(30) Foreign Application Priority Data
Nov. 14, 2011  (KR) ........................ 10-2011-0118304

(51) Int. Cl.
| | | |
|---|---|---|
| G02B 5/30 | (2006.01) | |
| G02F 1/1335 | (2006.01) | |
| H04N 13/04 | (2006.01) | |
| G02F 1/1362 | (2006.01) | |

(52) U.S. Cl.
CPC ........ *G02B 5/3058* (2013.01); *G02F 1/133512* (2013.01); *G02F 1/133536* (2013.01); *G02F 2001/133538* (2013.01); *G02F 2001/133548* (2013.01); *H04N 13/0434* (2013.01)

(58) Field of Classification Search
CPC .................. G02F 1/133512; G02F 1/136209; G02F 1/1335; G02F 2001/133548; G02F 1/33528; G02F 1/133536; G02F 1/133538; G02B 5/3058; H04N 13/0434

USPC ........... 349/96; 359/485.05, 486.01, 486.02, 359/462; 385/11
See application file for complete search history.

(56) References Cited

U.S. PATENT DOCUMENTS

| | | |
|---|---|---|
| 7,220,371 B2 | 5/2007 | Suganuma |
| 7,686,970 B2 | 3/2010 | Kolesnychenko et al. |
| 7,697,203 B2 * | 4/2010 | Cha et al. ...................... 359/465 |
| 7,961,393 B2 * | 6/2011 | Perkins ................ G02B 5/3058 |
| | | 359/485.05 |

(Continued)

FOREIGN PATENT DOCUMENTS

| | | |
|---|---|---|
| JP | 2004-271558 | 9/2004 |
| JP | 2005-316495 | 11/2005 |

(Continued)

OTHER PUBLICATIONS

WO2011065054; downloaded from https://patentscope.wipo.int on Dec. 7, 2015; translation from Japanese to English provided by website using Google Translate tool.*

(Continued)

*Primary Examiner* — Paisley L Arendt
*Assistant Examiner* — Angela Davison
(74) *Attorney, Agent, or Firm* — F. Chau & Associates, LLC (57) ABSTRACT

A liquid crystal display includes a first substrate. A plurality of fine metal lines is disposed on the first substrate. The plurality of fine metal lines including a plurality of small regions. A second substrate is aligned with the first substrate. A light blocking portion is disposed on the second substrate. The light blocking portion is disposed in a region between the small regions of the plurality of small regions of the plurality of fine metal lines.

5 Claims, 7 Drawing Sheets

(56) References Cited

U.S. PATENT DOCUMENTS

2005/0159019 A1    7/2005   Lee
2008/0100779 A1*   5/2008   Choo .................. G02B 5/3058
                                                                             349/96

FOREIGN PATENT DOCUMENTS

| JP | 2008-247022 | 10/2008 |
|---|---|---|
| JP | 2009-260293 | 11/2009 |
| JP | 2010-194733 | 9/2010 |
| KR | 10-2006-0030811 | 4/2006 |
| KR | 10-0582781 | 5/2006 |
| KR | 10-0643965 | 11/2006 |
| KR | 10-2007-0105092 | 10/2007 |
| KR | 10-0930925 | 12/2009 |
| KR | 10-1015065 | 2/2011 |

OTHER PUBLICATIONS

English Abstract for Publication No. 2004-271558.
English Abstract for Publication No. 2005-316495.
English Abstract for Publication No. 10-2006-0030811.
English Abstract for Publication No. 10-0582781.
English Abstract for Publication No. 10-0643965.
English Abstract for Publication No. 10-2007-0105092.
English Abstract for Publication No. 2008-247022.
English Abstract for Publication No. 2009-260293.
English Abstract for Publication No. 10-0930925.
English Abstract for Publication No. 2010-194733.
English Abstract for Publication No. 10-1015065.

* cited by examiner

LIQUID CRYSTAL DISPLAY INCLUDING WIRE GRID POLARIZER AND MANUFACTURING METHOD THEREOF

CROSS-REFERENCE TO RELATED APPLICATION

This application claims priority to and the benefit of Korean Patent Application No. 10-2011-0118304 filed in the Korean Intellectual Property Office on Nov. 14, 2011, the entire contents of which are incorporated herein by reference.

TECHNICAL FIELD

The present invention relates to a liquid crystal display, and more particularly, to a liquid crystal display including a wire grid polarizer and a manufacturing method thereof.

DISCUSSION OF THE RELATED ART

The liquid crystal display (LCD) is one of the most common types of flat panel displays currently in production. LCDs may include two panels on which field generating electrodes such as a pixel electrode and a common electrode are formed. A liquid crystal layer is interposed between the two panels. The liquid crystal display generates an electric field on a liquid crystal layer by applying voltage to the field generating electrodes and determines the orientation of liquid crystal molecules of the liquid crystal layer by the generated electric field, thus controlling polarization of incident light so as to display images.

In general, polarizing plates are attached onto external surfaces of the panels on which the field generating electrodes are formed to control polarization of incident light. Each polarizing plate may be an absorption type polarizing plate which absorbs light that does not have the desired polarization. Therefore, only a small part of a light source supplying light to the liquid crystal display by the polarizing plate is used for displaying an image and as a result, light efficiency of the light source of the liquid crystal display is lowered.

SUMMARY

Exemplary embodiments of the present invention provide a liquid crystal display including a large area wire grid polarizer without increasing a manufacturing cost and deteriorating a polarization characteristic, and a manufacturing method thereof.

An exemplary embodiment of the present invention provides a liquid crystal display including a first substrate. A plurality of fine metal lines is disposed on the first substrate and includes a plurality of small regions. A second substrate is aligned with the first substrate. A light blocking portion is disposed on the second substrate, in which the light blocking portion is disposed, in a region between the plurality of small regions of the plurality of fine metal lines.

In the plurality of small regions, the plurality of fine metal lines may be disposed to have predetermined widths at predetermined intervals in a predetermined direction.

The widths of the plurality of fine metal lines may be approximately 60 nm or less.

The intervals the plurality of fine metal lines may be approximately 120 nm or less.

The entire area of the plurality of fine metal lines may be 200 mm×200 mm or more.

A plurality of pixel areas may be disposed on the second substrate and the plurality of small regions may be disposed in the plurality of pixel areas.

The plurality of pixel areas may include first pixel areas and second pixel areas. In the first pixel area, the plurality of fine metal lines may be uniformly disposed in a first direction. In the second pixel area, the plurality of fine metal lines may be uniformly disposed in a second direction that is different from the first direction.

The second direction may be perpendicular to the first direction.

An exemplary embodiment of the present invention provides a method for manufacturing a liquid crystal display including stacking a metal layer on a first substrate. A photosensitive film layer is stacked on the metal layer. A photosensitive film pattern is formed on the photosensitive film layer by a nano-imprint method using a mold. The forming of the photosensitive film pattern may be repeated plural times while moving the mold. A plurality of fine metal patterns including a plurality of small regions corresponding to the molds is formed by etching the metal layer using the photosensitive film pattern. A light blocking portion is formed on a second substrate. The light blocking portion is disposed on boundary portions of the plurality of small regions by aligning the first substrate and the second substrate.

An exemplary embodiment of the present invention provides a method for manufacturing a liquid crystal display including stacking an etch control layer on a first substrate. A first photosensitive film layer is stacked on the etch control layer. A first photosensitive film pattern is fowled on the first photosensitive film layer by a nano-imprint method using a first mold. The forming of the first photosensitive film pattern is repeated plural times while moving the first mold. A plurality of etch control patterns is formed by etching the etch control layer using the first photosensitive film pattern. A first metal layer is stacked on the etch control patterns. A large area second mold including a plurality of first small regions corresponding to the first molds is formed by separating the metal layer from the etch control patterns. A second metal layer is stacked on a second substrate. A second photosensitive film layer is stacked on the second metal layer. A second photosensitive film pattern is formed on the second photosensitive film layer by a nano-imprint method using the second mold. A plurality of fine metal patterns including a plurality of second small regions of the second mold is formed by etching the second metal layer using the second photosensitive film pattern. A light blocking portion is formed on a third substrate. The light blocking portion is disposed at boundary portions of the plurality of second small regions by aligning the second substrate and the third substrate.

An exemplary embodiment of the present invention provides a method of manufacturing a liquid crystal display including stacking an etch control layer on a first substrate. A first photosensitive film layer is stacked on the etch control layer. A first photosensitive film pattern is formed on the first photosensitive film layer by a nano-imprint method using a first mold. The forming of the first photosensitive film pattern is repeated plural times while moving the first mold. A plurality of etch control patterns is formed by etching the etch control layer using the first photosensitive film pattern. A first metal layer is stacked on the etch control pattern. A large area second mold including a plurality of first small regions corresponding to the first molds is formed by separating the metal layer from the etch control patterns. A second photosensitive film layer is stacked on a second substrate. A second photosensitive film pattern is formed on the second photosensitive film layer by a nano-imprint method using the second mold. A plurality of fine metal patterns having a plurality of second small regions of the second mold is formed by stacking a metal layer on the second photosensitive film pattern. A light blocking portion is formed on a third substrate. The light blocking portion is disposed on boundary portions of the plurality of second small regions by aligning the second substrate and the third substrate.

According to exemplary embodiments of the present invention, a large area wire grid polarizer is formed using a small area mold in which a signal line or a light blocking member is disposed at connection portions of the molds or connection portions between the small area wire grid polarizers. Deterioration in a polarization characteristic due to an arrangement difference of the connection portions between the wire grid polarizers may thereby be reduced or prevented. Accordingly, a liquid crystal display including a large area wire grid polarizer may be formed without increasing a manufacturing cost and without deteriorating the polarization characteristic.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

Exemplary embodiments of the present invention will be described more fully hereinafter with reference to the accompanying drawings. As those skilled in the art would realize, the described exemplary embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. When an element such as a layer, film, region, or substrate is referred to as being "on" another element, it can be directly on the other element or intervening elements may also be present.

Hereinafter, a liquid crystal display and a manufacturing method thereof according to an exemplary embodiment of the present invention will be described with reference to the accompanying drawings.

Figure 1:
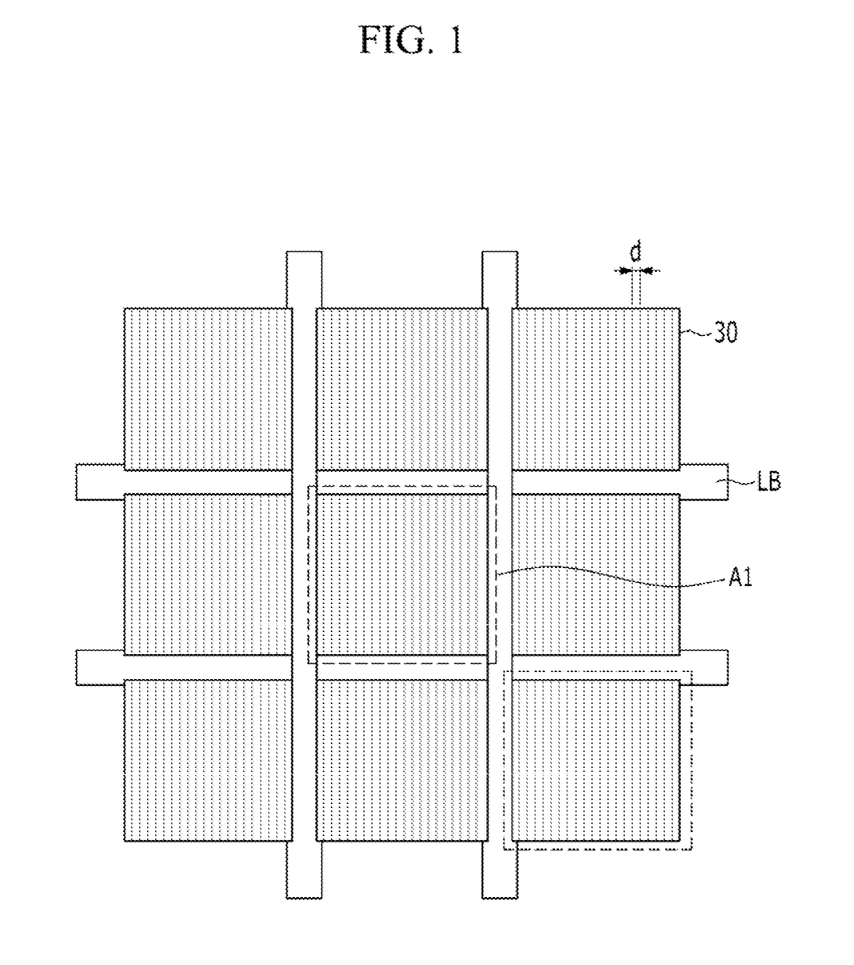
FIG. 1 is a layout view of a liquid crystal display according to an exemplary embodiment of the present invention.

A liquid crystal display according to an exemplary embodiment of the present invention will be described with reference to FIG. 1. FIG. 1 is a layout view of a liquid crystal display according to an exemplary embodiment of the present invention.

Referring to FIG. 1, a liquid crystal display according an exemplary embodiment of the present invention includes a first wire grid polarizer 30 including a plurality of small regions A1. Line widths of fine patterns of the first wire grid polarizer 30 may be approximately 60 nm or less. Distances d between the fine patterns of the first wire grid polarizer 30 may be approximately 120 nm or less. The entire area of the first wire grid polarizer 30 may be approximately 200 mm×200 mm or more.

A light blocking portion LB is disposed at boundary portions between the small regions A1 of the first wire grid polarizer 30. The light blocking portion LB may be a metal signal line such as a gate line, a data line, and a storage voltage line or a black matrix.

The first wire grid polarizer 30 may be formed by repeating a step of forming the small region A1.

As described above, in the liquid crystal display according to an exemplary embodiment of the present invention, the wire grid polarizer 30 having a large area is formed to include the plurality of small regions A1. The light blocking portion LB is disposed at the boundary portions between the small regions A1 of the wire grid polarizer 30 to prevent light from being transmitted. Accordingly, deterioration in a polarization characteristic which may occur at the boundary portions between the small regions A1 of the wire grid polarizer 30 may be reduced or prevented. Therefore, the liquid crystal display including the large area wire grid polarizer may be provided without increasing a manufacturing cost or deteriorating the polarization characteristic.

Figure 2:
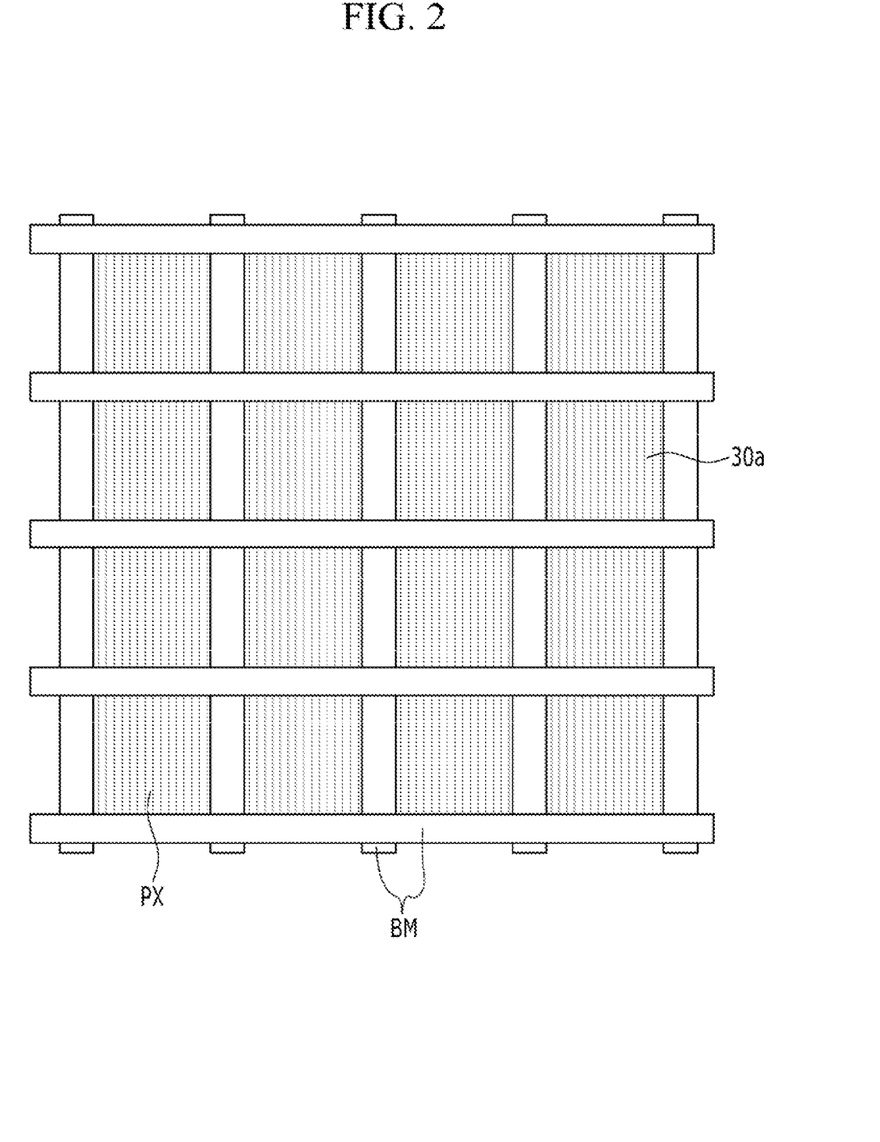
FIG. 2 is a layout view of a liquid crystal display according to an exemplary embodiment of the present invention.

A liquid crystal display according to an exemplary embodiment of the present invention will be described with reference to FIG. 2. FIG. 2 is a layout view of a liquid crystal display according to an exemplary embodiment of the present invention.

Referring to FIG. 2, the liquid crystal display according to an exemplary embodiment of the present invention includes a plurality of pixel areas PX and second wire grid polarizers 30a which are disposed at aperture regions of the pixel areas PX.

The second wire grid polarizers 30a are formed together on a display panel on which pixel electrodes of the plurality of pixel areas PX of the liquid crystal display are formed, and may be, for example, disposed on the aperture regions of the pixel areas PX through which light from a backlight is transmitted. Line widths of fine patterns of the second wire grid polarizer 30a may be approximately 60 nm or less. Distances between the fine patterns of the second wire grid polarizer 30a may be approximately 120 nm or less. The entire area of the first wire grid polarizer 30 may be 200 mm×200 mm or more.

The second wire grid polarizer 30a includes a plurality of small regions which are disposed on the aperture regions of the pixel areas PX. Boundary portions between the plurality of small regions are covered by a light blocking member BM. Therefore, since in the boundary portions of the plurality of small regions of the second wire grid polarizer 30a the light is prevented from being transmitted by the light blocking member BM, deterioration in a polarization characteristic which may occur at the boundary portions of the plurality of small regions of the second wire grid polarizer 30a may be reduced or prevented. Accordingly, a liquid crystal display including the large area wire grid polarizer may be provided without increasing a manufacturing cost or deteriorating the polarization characteristic.

Figure 3:
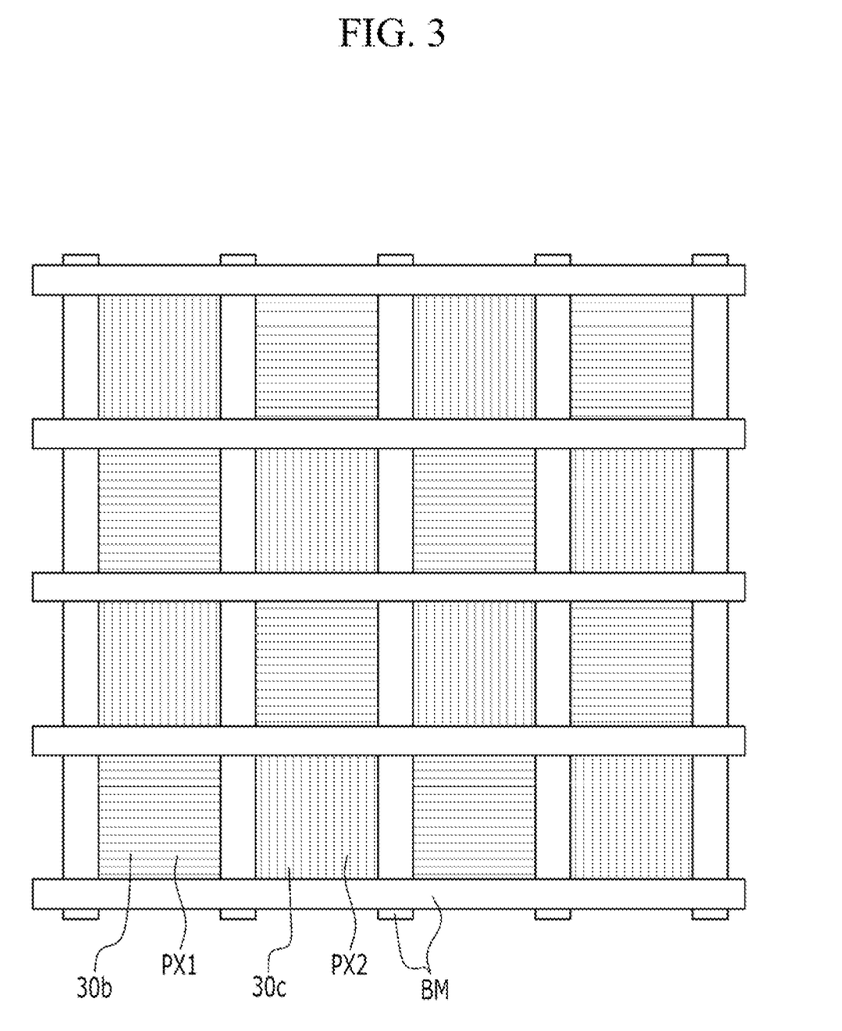
FIG. 3 is a layout view of the liquid crystal display according to an exemplary embodiment of the present invention.

A liquid crystal display according to an exemplary embodiment of the present invention will be described with reference to FIG. 3. FIG. 3 is a layout view of the liquid crystal display according to an exemplary embodiment of the present invention.

Referring to FIG. 3, a liquid crystal display according to an exemplary embodiment of the present invention includes a plurality of first pixel areas PX1 and a plurality of second pixel areas PX2. Third wire grid polarizers 30b and 30c are disposed on aperture regions of the first and second pixel areas PX1 and PX2, respectively. The third wire grid polarizers 30b and 30c include first polarization portions and second polarization portions, respectively.

The first polarization portions including fine metal lines arranged in a first direction are disposed in the first pixel areas PX1 and the second polarization portions including fine metal lines arranged in a second direction different from the first direction are disposed in the second pixel areas PX2. The second direction may be perpendicular to the first direction.

The third wire grid polarizers 30b and 30c are formed together on a display panel on which pixel electrodes of the plurality of pixel areas PX of the liquid crystal display are formed. For example, the third wire grid polarizers 30b and 30c may be disposed on the aperture regions of the pixel areas PX through which light from a backlight is transmitted. Line widths of fine patterns of the third wire grid polarizers 30b and 30c may be approximately 60 nm or less. Distances between the fine patterns of the third wire grid polarizers 30b and 30c may be approximately 120 nm or less. The entire area of the first wire grid polarizer 30 may be 200 mm×200 mm or more.

In the liquid crystal display according to an exemplary embodiment, the first polarization portions 30b disposed in the first pixel areas PX1 and the second polarization portions 30c disposed in the second pixel areas PX2 polarize light in directions perpendicular to each other. This structure is used for a liquid crystal display for displaying a 3D image by making polarization directions of a left eye and a right eye different. For example, the first pixel areas PX1 may be pixel areas which are recognized by the left eye and the second pixel areas PX2 may be pixel areas which are recognized by the right eye.

The third wire grid polarizers 30b and 30c include a plurality of small regions disposed on the aperture regions of pixel areas PX. Boundary portions of the plurality of small regions are covered by a light blocking member BM. Therefore, since in the boundary portions of the plurality of small regions of the third wire grid polarizers 30b and 30c, the light is prevented from being transmitted by the light blocking member BM, deterioration in a polarization characteristic which may occur at the boundary portions of the plurality of small regions of the third wire grid polarizers 30b and 30c may be minimized or prevented. Accordingly, it is possible to provide the liquid crystal display including the large area wire grid polarizer without increasing a manufacturing cost and deteriorating the polarization characteristic.

Figure 4:
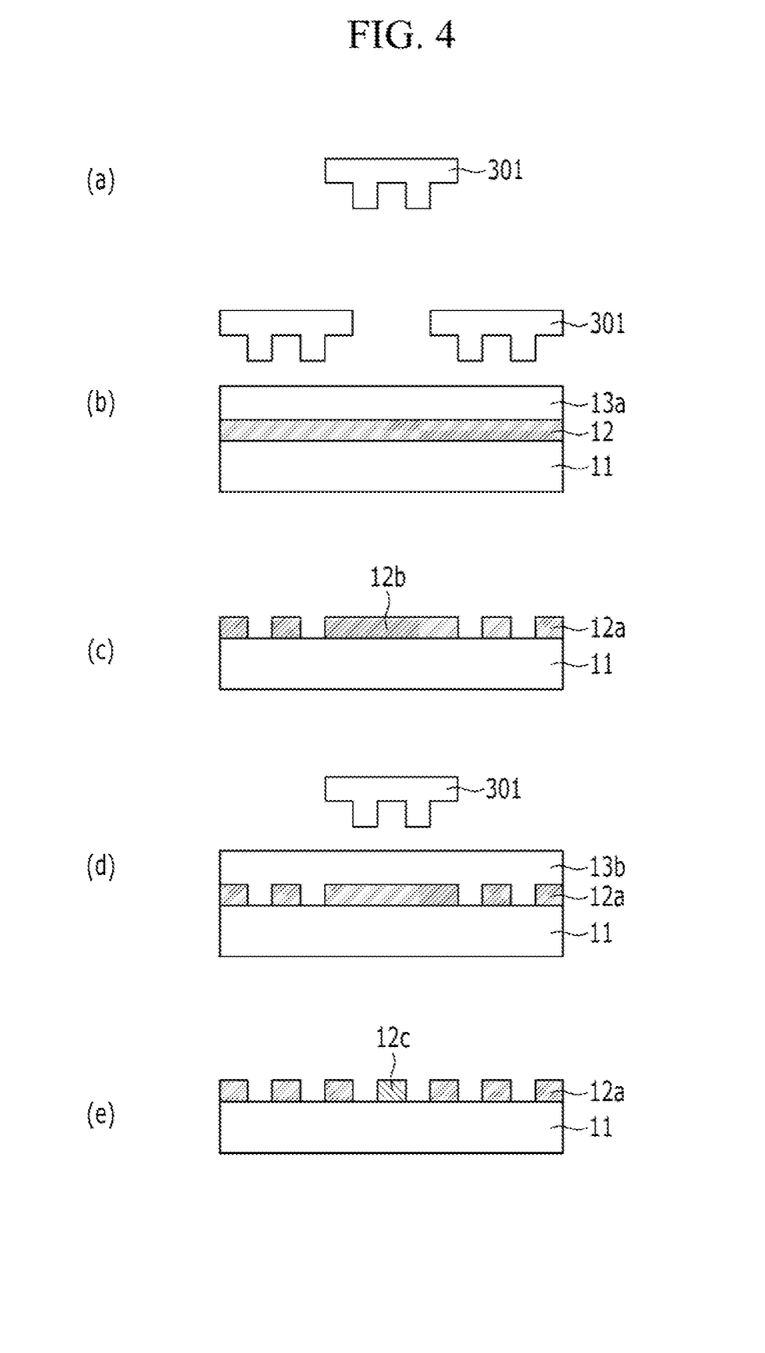
FIG. 4 is a cross-sectional view showing a method of manufacturing the liquid crystal display according to an exemplary embodiment of the present invention.

A method of manufacturing the liquid crystal display according to an exemplary embodiment of the present invention will be described with reference to FIG. 4. FIG. 4 is a cross-sectional view showing a method for manufacturing the liquid crystal display according to an exemplary embodiment of the present invention.

Referring to FIG. 4A, in a method of manufacturing a polarizer of the liquid crystal display according to an exemplary embodiment of the present invention, a small area first mold 301 is manufactured. The mold may be formed of silicon, glass, nickel (Ni), resist, and the like and may be used repeatedly. The mold is formed by a photolithography method so as to have a width and a distance of, for example, 50 nm.

Referring to FIG. 4B, a metal layer 12 is stacked on a substrate 11, a photosensitive film is stacked on the metal layer 12, and then a first photosensitive film pattern 13a is formed from the photosensitive film by a nano-imprint method using a plurality of first molds 301. A hard mask layer such as silicon oxide ($SiO_2$) or the like may be stacked between the metal layer 12 and the photosensitive film. When the hard mask layer is provided, it is possible to increase a margin of an etching condition at the time of etching as shown in FIG. 4C. The metal layer 12 may include any one of aluminum (Al), gold (Au), silver (Ag), copper (Cu), chromium (Cr), and iron (Fe). According to an exemplary embodiment, the plurality of first molds 301 are used, but a single first mold 301 may also be used. Further, the first photosensitive film pattern 13a is formed on a portion of the entire area on which the polarizer is formed and after the mold is moved, the first photosensitive film pattern 13a is formed again. These steps are repetitively performed and as a result, the first photosensitive film pattern 13a may be formed in a large area.

Thereafter, referring to FIG. 4C, after a recess portion of the photosensitive film pattern 13a is removed, the metal layer 12 is etched using the photosensitive film pattern 13a as a mask and the remaining photosensitive film pattern is removed by an ashing process, thereby forming a polarizer having a desired fine first metal pattern 12a. At this time, a second metal pattern 12b different from the first metal pattern 12a may be formed on a region between the plurality of first molds 301. The second metal pattern 12b may also act as a polarizer.

The manufactured polarizer is aligned with a manufactured display panel, and thus, the second metal pattern 12b of the polarizer is aligned with a light blocking portion of the display panel, thereby forming a liquid crystal display.

In a liquid crystal display according to an exemplary embodiment of the present invention, as shown in FIG. 4D, after the photosensitive film is stacked again on the substrate on which the first metal pattern 12a and the second metal pattern 12b are formed, a second photosensitive film pattern 13b is formed by nano-imprinting a portion formed with the second metal pattern 12b using the first molds 301. After removing a recess portion of the second photosensitive film pattern 13b, a third metal pattern 12c is formed by a double nano-imprint method of etching the second metal pattern 12b using the second photosensitive film pattern 13b as an etching mask. The third metal pattern 12c may also cover the boundary portions. The fine metal patterns 12a and 12c may be formed on the entire polarizer by the double nano-imprint method. However, even though the double nano-imprint method is used, intervals between the fine metal patterns 12a and 12c may not be uniform at boundary portions due to an arrangement error of the mold 301 and the boundary portions may be aligned with the light blocking portion of the display panel.

As described above, in the liquid crystal display according to an exemplary embodiment of the present invention, the polarizer is formed by repeating the nano-imprint process using the mold having a smaller area than the entire area of the polarizer. The boundary portions between the small regions of the polarizer are aligned with the light blocking portion of the display panel, thereby preventing deterioration in the polarization characteristic which may occur at the boundary portions of the plurality of small regions of the polarizer. Accordingly, a liquid crystal display including a large area wire grid polarizer may be provided without increasing a manufacturing cost or deteriorating the polarization characteristic.

Figure 5:
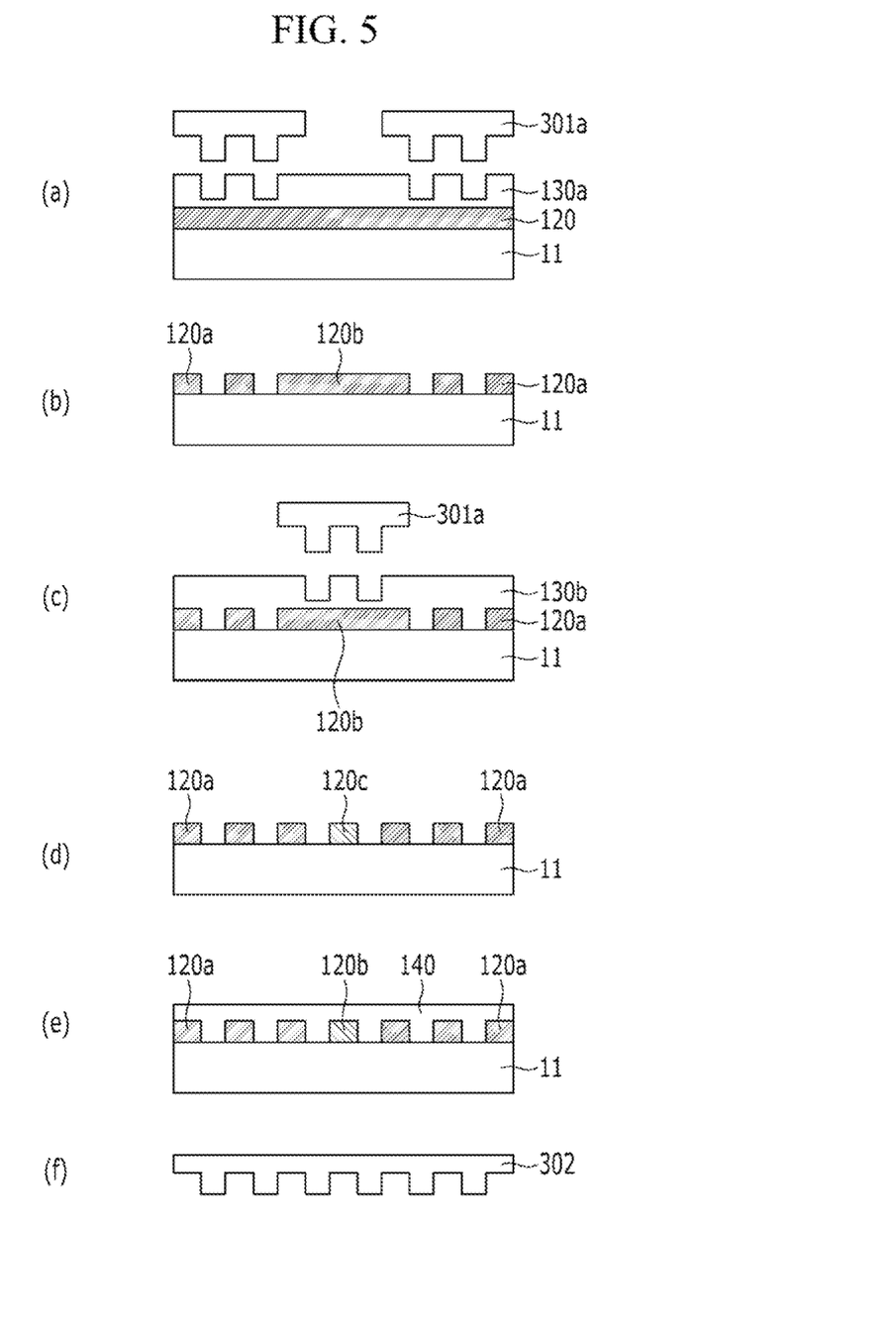
FIGS. 5 and 6 are cross-sectional views showing a method of manufacturing the liquid crystal display according to an exemplary embodiment of the present invention.
Figure 6:
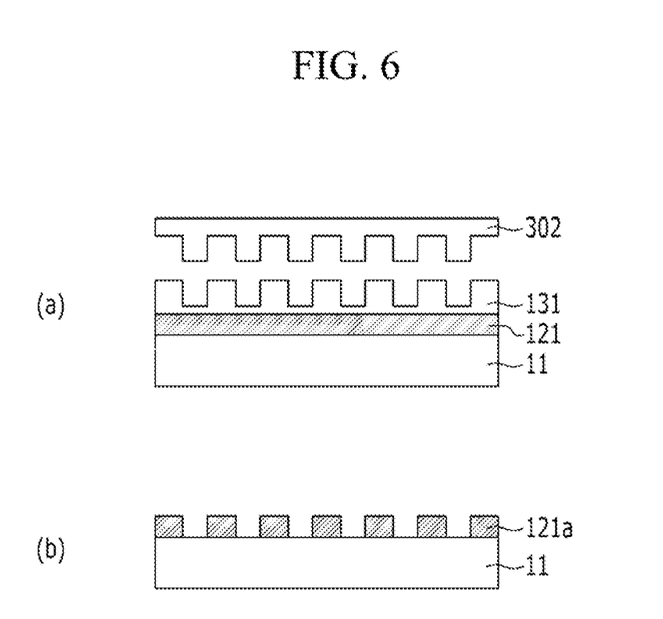

A method of manufacturing a liquid crystal display according to an exemplary embodiment of the present invention will be described with reference to FIGS. 5 and 6. FIGS. 5 and 6 are cross-sectional views showing a method of manufacturing the liquid crystal display according to an exemplary embodiment of the present invention.

A method of manufacturing a mold will be described with reference to FIG. 5.

Referring to FIG. 5A, in a method of manufacturing a polarizer of the liquid crystal display according to an exemplary embodiment of the present invention, a small area first mold 301a is manufactured. The mold may be formed of silicon, glass, nickel (Ni), resist, and the like and may be used repeatedly. The mold is formed by a photolithography method in order to have a width and a distance of, for example, 50 nm.

After an etch control layer 120 is stacked on a substrate 11 and a photosensitive film is stacked on the etch control layer 120, a third photosensitive film pattern 130a is formed by a nano-imprint method using the first mold 301a.

Thereafter, referring to FIG. 5B, after removing a recess portion of the photosensitive film pattern 130a, the etch control layer 120 is etched using the photosensitive film pattern 130a as a mask and the remaining photosensitive film pattern is removed by an ashing process, thereby forming a desired fine first etch control pattern 120a and a second etch control pattern 120b disposed at a boundary portion of the first etch control pattern 120a.

Referring to FIG. 5C, a fourth photosensitive film pattern 130b is formed by an additional double nano-imprint method and as shown in FIG. 5D, after removing a recess portion of the fourth photosensitive film pattern 130b, the second etch control pattern 120b of the etch control layer 120 is etched again using the fourth photosensitive film pattern 130b as a mask, thereby forming a third etch control pattern 120c. Herein, the steps shown in FIG. 5C and FIG. 5D may be optionally omitted.

Referring to FIG. 5E, a metal layer 140 is stacked on the substrate 12 including the first etch control pattern 120a and the third etch control pattern 120c by electroplating or the like, and then the metal layer 140 is separated, thereby forming a large area second mold 302 as shown in FIG. 5F. Further, the large area second mold 302 is formed as shown in FIG. 5F by the nano-imprint method.

Next, as shown in FIG. 6A, a second metal layer 121 is stacked on a substrate 11, a photosensitive film is stacked on the second metal layer 121, and then a fifth photosensitive film pattern 131 is formed using the large area second mold 302 formed with reference to FIG. 5.

As shown in FIG. 6B, after removing a recess portion of the fifth photosensitive film pattern 131, the second metal layer 121 is etched using the fifth photosensitive film pattern 131 as an etching mask, thereby forming a polarizer on which a desired fourth metal pattern 121a is disposed in a large area.

Thereafter, a part between small regions corresponding to regions in which the first molds 301a are disposed when the second mold 302 is formed, is aligned with a light blocking portion of a display panel. Accordingly, deterioration in a polarization characteristic of the polarizer which may occur between the small regions of the polarizer may be reduced or prevented. Accordingly, it is possible to provide the liquid crystal display including the large area wire grid polarizer without increasing a manufacturing cost and deteriorating the polarization characteristic.

A method for manufacturing a liquid crystal display according to an exemplary embodiment of the present invention will be described with reference to FIG. 5 and FIG. 7.

First, as described above with reference to FIG. 5, the large area second mold 302 is formed.

Figure 7:
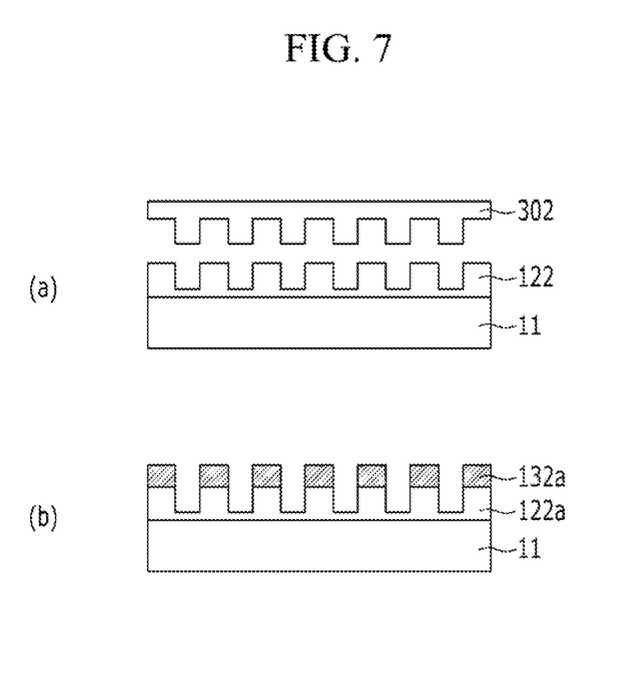
FIG. 7 is a cross-sectional view showing a method of manufacturing the liquid crystal display according to an exemplary embodiment of the present invention.

Thereafter, as shown in FIG. 7A, a photosensitive film is stacked on a substrate 11 and a sixth photosensitive film pattern 122 is formed by a nano-imprint method using the second mold 302. Then, as shown in FIG. 7B, a metal layer is stacked on the sixth photosensitive film pattern 122, thereby forming a polarizer on which a desired fifth metal pattern 122a is disposed in a large area.

Thereafter, a part between small regions corresponding to regions in the first molds 301a are disposed when the second 302 is formed, is aligned with a light blocking portion of a display panel. Accordingly, it is possible to prevent deterioration in a polarization characteristic of the polarizer which may occur between the small regions of the polarizer. Accordingly, it is possible to provide the liquid crystal display including the large area wire grid polarizer without increasing a manufacturing cost and without deteriorating the polarization characteristic.

While exemplary embodiments of the present invention have been described in connection with the figures, it is to be understood that the invention is not limited to the disclosed embodiments, but is intended to cover various modifications and equivalent arrangements.

What is claimed is:

1. A liquid crystal display, comprising:
a first substrate;
a large wire grid polarizer comprising a plurality of discrete small wire grid polarizers that are joined together, each of which is smaller than the large wire grid polarizer, wherein the large wire grid polarizer is disposed on the first substrate, and wherein each of the small wire grid polarizers has a rectangular area and includes a plurality of fine metal lines;
a second substrate aligned with the first substrate; and
a light blocking portion disposed on the second substrate in a grid pattern,
wherein a plurality of pixel areas is disposed on the second substrate and the plurality of small wire grid polarizers is disposed in the plurality of pixel areas,
wherein the light blocking portion overlaps portions between the plurality of small wire grid polarizers,
wherein in the plurality of small wire grid polarizers, each of the plurality of fine metal lines are disposed having predetermined widths and intervals in a predetermined direction, and
wherein in the some parts of light blocking portion overlapped portions between the plurality of small wire grid polarizers, the plurality of fine metal lines are disposed at different intervals compared to the intervals of fine metal lines of the plurality of small wire grid polarizers, and wherein the plurality of pixel areas includes first pixel areas and second pixel areas, in the first pixel areas, each of the plurality of fine metal lines are uniformly disposed in a first direction, and in the second pixel areas, each of the plurality of fine metal lines are uniformly disposed in a second direction different from the first direction.

2. The liquid crystal display of claim 1, wherein: the widths of each of the plurality of fine metal lines are approximately 60 nm or less.

3. The liquid crystal display of claim 2, wherein: the intervals between each of the plurality of fine metal lines are approximately 120 nm or less.

4. The liquid crystal display of claim 3, wherein: the entire area of the large wire grid polarizer is 200 mm×200 mm or more.

5. The liquid crystal display of claim 1, wherein: the second direction is perpendicular to the first direction.

\* \* \* \* \*